May 14, 1963  W. E. SAXE  3,089,578
REFRIGERATOR CAR ICING MACHINE
Filed Jan. 17, 1961  2 Sheets-Sheet 1
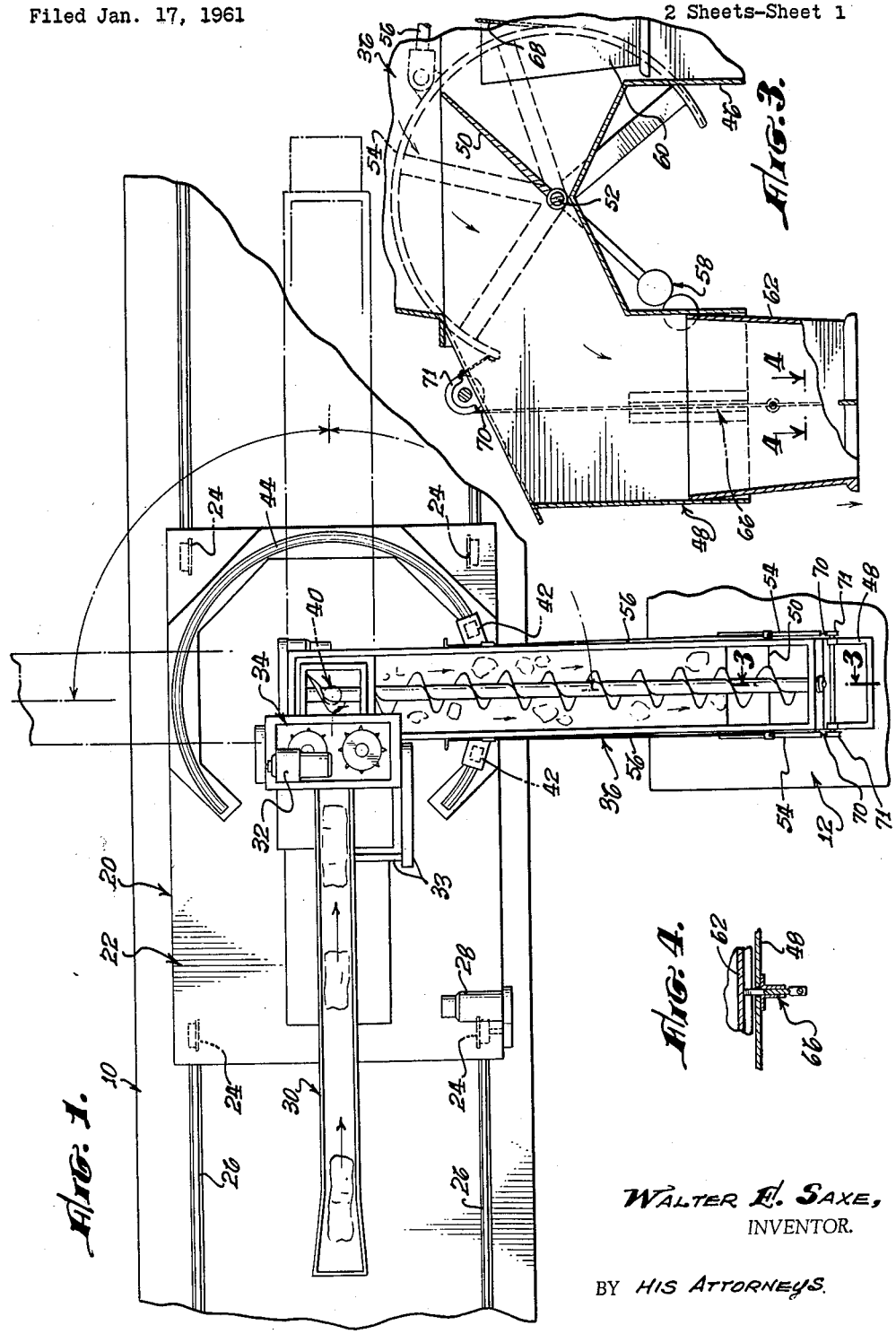
WALTER E. SAXE,
INVENTOR.
BY HIS ATTORNEYS.
HARRIS, KIECH, RUSSELL & KERN.

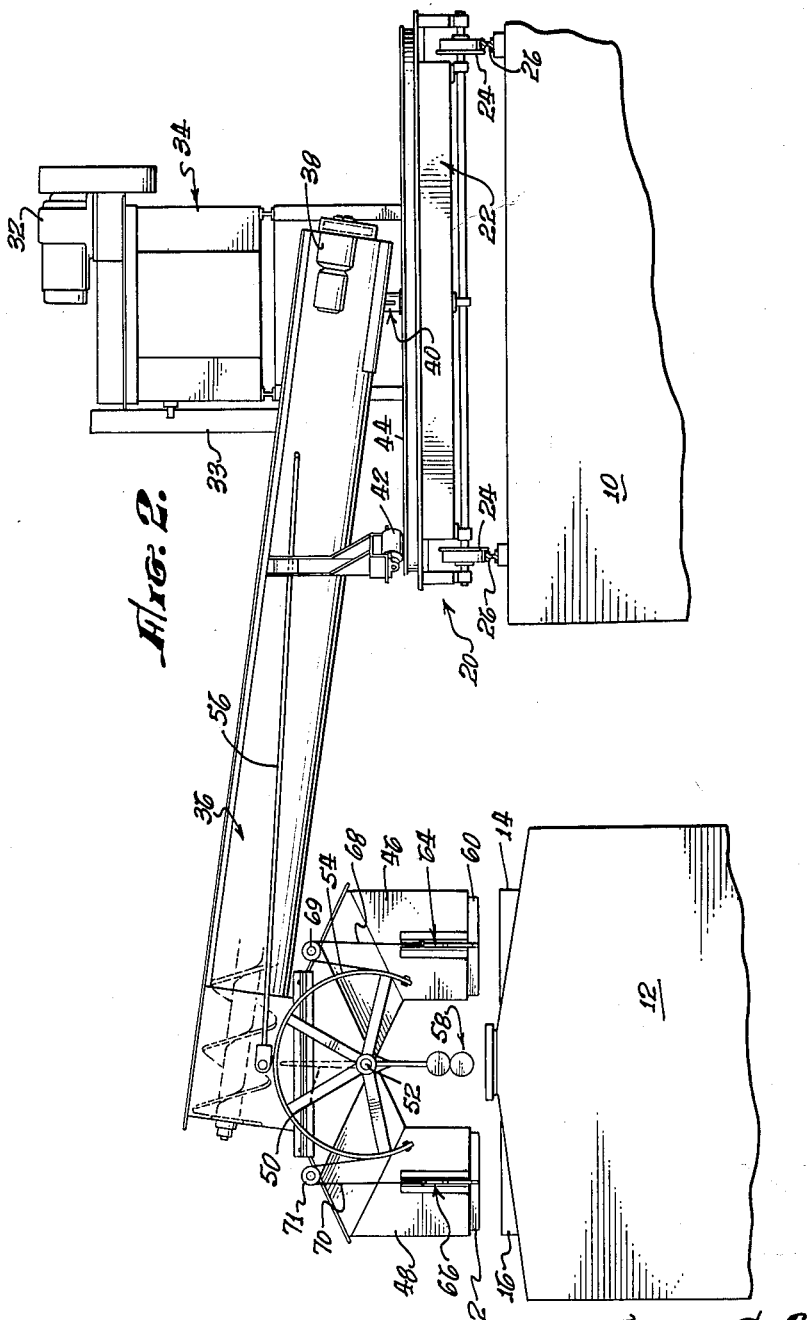

United States Patent Office 3,089,578
Patented May 14, 1963

3,089,578
REFRIGERATOR CAR ICING MACHINE
Walter E. Saxe, Pebble Beach, Calif., assignor to The Conveyor Company, Los Angeles, Calif., a corporation of California
Filed Jan. 17, 1961, Ser. No. 83,226
2 Claims. (Cl. 198—47)

The present invention relates to a refrigerator car icing machine and, more particularly, to a machine which is movable along an elevated dock to ice a train of cars paralleling the dock, or to ice two trains of cars respectively disposed on opposite sides of and paralleling the dock.

One conventional dock icer for servicing two trains of cars includes two transverse conveyors respectively projecting laterally from the dock in opposite directions, gate means being provided to direct ice to one conveyor or the other depending on which train of cars is to be serviced. Such a conventional machine, since it requires two conveyors for the respective trains of cars, is quite heavy and frequently cannot be installed on existing docks without reinforcement thereof. Further, the two laterally extending conveyors are permanently perpendicular to the path of movement of the machine along the dock, which means that they must be provided with elevatable outer sections to clear locomotives in the trains of cars, or other obstructions, as the machine is moved along the dock.

A general object of the invention is to provide a dock icer capable of servicing two trains of refrigerator cars which overcomes the foregoing disadvantages of prior icing equipment.

More particularly, a primary object of the invention is to provide an icing machine of the foregoing nature having a single, boom-type screw conveyor which is pivotable relative to a wheeled chassis from an intermediate inoperative position generally parallel to the path of movement along the dock to either of two operating positions spaced substantially 180° apart and generally perpendicular to the path of movement.

The foregoing construction greatly reduces the weight of the icing machine, as compared to prior machines, since only one conveyor is required to service two trains of cars, such conveyor being swung to one side of the dock or the other, depending upon which train is to be serviced. It will be understood that the conveyor may be swung alternately to one side and then the other as the icing machine progresses along the dock, whereby successive bunkers in the two trains are filled alternately. With this construction, the machine of the invention may in most instances be installed on existing docks without any reinforcement thereof, which is an important feature.

Another important advantage of the invention is that in order to clear a locomotive, or other obstruction, it is merely necessary to swing the conveyor into its intermediate inoperative position. This eliminates any necessity for providing the conveyor with an elevatable section to clear obstructions.

The boom-type screw conveyor is provided at its outer end with two discharge hoppers and gate means for selectively directing ice into the discharge hoppers, thereby permitting delivery of ice to the hatches of each pair selectively.

An important object of the invention is to provide on the boom-type screw conveyor two discharge chutes respectively communicating with the discharge hoppers and respectively movable relative thereto between upper retracted and lower extended positions, and to provide actuating means interconnecting the gate means and the discharge chutes for moving the gate means into a position to deliver ice to one of the discharge hoppers and discharge chutes, and for simultaneously moving the discharge chute to which ice is being delivered into its extended position and the other discharge chute into its retracted position. With this construction, the extended discharge chute guides the ice directly into a bunker therebeneath without loss, the extended discharge chute coming virtually into contact with the hatch of the bunker.

Another object of the invention is to provide gravity operated means for biasing the gate means at the outer end of the boom-type screw conveyor toward an intermediate inoperative position, and for simultaneously biasing the discharge chutes toward intermediate positions.

A further object is to provide a boom-type screw conveyor which slopes upwardly from its inner end to its outer end at an angle such that coasting of the screw conveyor upon deenergization of its driving motor is minimized, thereby eliminating any necessity for a brake. With this construction, the operator can control accurately the number of pieces of ice discharged into each bunker.

Still another object is to provide an icing machine having means for picking up blocks of ice from a dock conveyor, and means for breaking the blocks of ice into smaller pieces and for delivering them to the inlet end of the boom-type screw conveyor.

The foregoing objects, advantages, features and results of the present invention, together with various other objects, advantages, features and results thereof which will be evident to those skilled in the dock icer art, may be achieved with the exemplary embodiment of the invention described in detail hereinafter and illustrated in the accompanying drawings, in which:

FIG. 1 is a plan view of a dock icer which embodies the invention;

FIG. 2 is an end view of the dock icer with the boom-type screw conveyor thereof in one of its operating positions;

FIG. 3 is an enlarged, fragmentary sectional view taken along the arrowed line 3—3 of FIG. 1; and FIG. 4 is an enlarged, fragmentary sectional view taken along the arrowed line 4—4 of FIG. 3 of the drawings.

Referring to the drawings, the numeral 10 designates an elevated dock adjacent which is located a parallel train of refrigerator cars one of which is shown and is designated by the numeral 12. As is conventional, the car 12 is provided with ice bunkers adapted to be filled through side-by-side hatches, two of these being shown and being designated by the numerals 14 and 16, respectively. It will be understood that another train of cars, not shown, may be located on the opposite side of and parallel to the dock 10.

The icer or icing machine of the invention is designated generally by the numeral 20 and includes a mobile chassis 22 having wheels 24 mounted on rails 26 extending longitudinally of the dock 10. The icer 20 may be propelled along the dock 10 in any suitable manner, as by means of a motor 28 connected to one of the wheels 24.

The icing machine 20 includes a longitudinal, upwardly sloping, pickup conveyor 30 driven by a motor 32 through a driving connection 33 and adapted to pick up blocks of ice from the dock 10 between the rails 26. Preferably, the pickup conveyor 30 is supplied with blocks of ice by a dock conveyor, not shown, located between the rails 26 and running the length of the dock 10. Such a dock conveyor would move the blocks of ice toward the inlet end of the pickup conveyor 30 and onto the pickup conveyor, the blocks of ice then moving upwardly along the pickup conveyor to its outlet end.

The elevated outlet end of the pickup conveyor 30 communicates with an ice breaker 34 driven by the motor 32.

The ice breaker 34 may be of any suitable construction, such as that shown in my patent application Serial No. 759,715, filed September 8, 1958.

The chunks or pieces of ice discharged by the ice breaker 34 drop into the inner, inlet end of a boom-type screw conveyor 36 driven by a motor 38. The screw conveyor 36 is pivotally mounted on the chassis 22 at its inner end so that it may be swung horizontally from an inoperative intermediate position generally paralleling the path of movement of the icing machine 20, to either of two operating positions generally perpendicular to the path of movement. One of the operating positions of the screw conveyor 36 is shown in solid lines in FIGS. 1 and 2 of the drawings, while the other operating position thereof and the inoperative intermediate position thereof are shown in broken lines in FIG. 1 of the drawings. When the screw conveyor 36 is in either of its operating positions, it projects laterally beyond the dock 10 and over a train of refrigerator cars thereadjacent, as will be apparent from FIG. 2 of the drawings in particular.

Considering more specifically the manner in which the screw conveyor 36 is pivotally mounted on the chassis 22, the inner end thereof is connected to the chassis by a vertical pivot means 40, best shown in FIG. 2 of the drawings. Additionally, the screw conveyor 36 is supported at a point outwardly from its inner end by roller 42 engaging an arcuate track 44 on the chassis 22.

It might be pointed out at this juncture that the screw conveyor 36 is inclined upwardly from its inner end toward its outer end at a substantial angle, this angle being such that coasting upon deenergization of the motor 38 is minimized so that no brake for preventing coasting is necessary. With this construction, by energizing the motor 38 repeatedly and momentarily, pieces of ice can be discharged from the screw conveyor 36 one at a time to insure accurate filling of the bunkers of the car 12.

The screw conveyor 36 is provided at its outer end with two discharge hoppers 46 and 48 spaced apart in the direction of the screw conveyor and respectively adapted to register with the hatches 14 and 16. The screw conveyor 36 is also provided at its outer end with a gate means 50, shown as a simple butterfly-type valve, which directs the ice discharged by the screw conveyor 36 into one or the other of the discharge hoppers 46 and 48. The gate means 50 is movable from an inoperative intermediate position to either of two operating positions, one of these being shown in FIG. 3 of the drawings. As will be apparent, when the gate means 50 is in the operating position shown in FIG. 3, it directs the ice discharged by the screw conveyor 36 into the discharge hopper 48.

The gate means 50 is mounted on a shaft 52 having wheels 54 fixed on its ends externally of the discharge hoppers 46 and 48. Two actuating handles 56 are pivotally connected to the respective wheels 54 and extend along opposite sides of the screw conveyor 36 to the chassis 22, where they are accessible to an operator of the machine 20. Suitable latch means, not shown, may be provided for latching the gate means 50 in either of its operating positions.

The invention provides gravity operated, pendulum means 58 for biasing the gate means 50 toward its intermediate inoperative position. The pendulum means 58 comprises simply weights connected to the wheels 54.

An important feature of the invention is that the screw conveyor 36 is provided at its outer end with vertically movable discharge chutes 60 and 62 telescopically disposed within and communicating with the respective discharge hoppers 46 and 48. The discharge chutes 60 and 62 are guided for vertical movement relative to the discharge hoppers 46 and 48, respectively, by suitable guide means 64 and 66, the latter being shown in detail in FIG. 4 of the drawings.

The gate means 50 and the discharge chutes 60 and 62 are interconnected by an actuating means in such a manner that the discharge chute into which ice is being directed by the gate means is in its lowermost, extended position so that the lower end thereof substantially contacts the corresponding hatch 14 or 16, thereby substantially eliminating any possibility of ice spillage. The other, or inoperative, discharge chute is in its uppermost, retracted position under such conditions.

Considering the nature of the foregoing actuating means interconnecting the gate means 50 and the discharge chutes 60 and 62, it includes two cables 68 located on opposite sides of the discharge hopper 46 and two cables 70 located on opposite sides of the discharge hopper 48. Each cable 68 is connected at one end to one end of the corresponding wheel 54 and is connected at its other end to the corresponding side of the discharge chute 60, being trained over a pulley 69 on the hopper 46 intermediate its ends. Similarly, each cable 70 is connected at one end to the other end of the corresponding wheel 54, and is connected at its other end to the corresponding side of the discharge chute 62, being trained over a pulley 71 on the hopper 48 intermediate its ends. The cables 68 and 70 are adapted to wrap partially around the wheels 54, as will be apparent from the right side of FIG. 3 of the drawings.

As will be apparent from FIG 3, when the wheels 54 are turned, by means of one of the actuating handles 56, to move the gate means 50 into a position to direct ice discharged by the screw conveyor 36 into the discharge hopper 48, the wheels 54 slacken the cables 70 to lower the discharge chute 62 substantially into contact with the hatch 16. At the same time, the wheels 54 take up on the cables 68 to raise the discharge chute 60 into its uppermost position. The reverse occurs when the wheels 54 are moved into a position to cause the gate means 50 to direct ice into the discharge hopper 46. Thus, only the discharge chute 60 or 62 to which ice is to be directed is in its lowered position, the other discharge chute being raised, the interconnection between the discharge chutes providing means for counterbalancing the weights thereof. When the gate means 50 is in its intermediate inoperative position, the discharge chutes 60 and 62 are also in intermediate positions because of the interconnection between them.

*Operation*

It will be apparent that the icing machine 20 of the invention may be utilized to service either a single train of cars 12 on one side of the dock 10, or two trains of cars on opposite sides of the dock. In the latter event, successive bunkers on opposite sides of the dock 10 are filled alternately by swinging the screw conveyor 36 first to one side of the dock and then the other. While no power means for doing this has been shown, it will be understood that one can readily be added if desired.

The foregoing construction results in minimum weight for the icing machine 20 since the one screw conveyor 36 is utilized to service trains of cars on both sides of the dock 10, which is an important feature.

It will be noted that if an obstruction, such as a locomotive, is encountered in moving the icing machine 20 along the dock 10, it is merely necessary to swing the screw conveyor 36 into its intermediate inoperative position, wherein it is disposed generally parallel to the path of movement of the machine and within the lateral confines of the dock 10. Thus, it is not necessary to provide the screw conveyor 36 with an elevatable section to clear obstructions, which is an important feature.

As previously described, the gate means 50 may be moved back and forth between its operating positions to deliver ice to the discharge hoppers 46 and 48 selectively, depending on whether ice is to be delivered to the inner hatch 14 of a particular pair, or to the outer hatch 16 thereof. The actuating means interconnecting the gate means 50 and the discharge chutes 60 and 62 automatically lowers the active discharge chute substantially into engagement with the corresponding hatch, which is an important feature.

Although an exemplary embodiment of the invention has been disclosed herein for purposes of illustration, it will be understood that various changes, modifications and substitutions may be incorporated in such embodiment without departing from the spirit of the invention as defined by the claims which follow.

I claim:
1. In a refrigerator car icing machine, the combination of:
   (a) a supporting chassis movable along a predetermined path;
   (b) a rigid, one-piece, boom-type screw conveyor fixedly mounted on said chassis with respect to movement in the vertical direction, and pivotally mounted on said chassis for swinging movement about an upright axis, through an angle of substantially 180° in the horizontal direction, between two operative positions through an intermediate, inoperative position;
   (c) said screw conveyor being generally parallel to said path when in its inoperative position, and being generally perpendicular thereto when in either of its operative positions;
   (d) said screw conveyor being inclined upwardly at a fixed angle from its inner end to its outer end;
   (e) means for delivering ice to the inner end of said screw conveyor;
   (f) two depending discharge hoppers carried by said screw conveyor adjacent the outer end thereof and spaced apart in the direction of said screw conveyor;
   (g) two depending discharge chutes respectively communicating with said discharge hoppers and respectively movable vertically relative thereto between upper, retracted and lower, extended positions;
   (h) pivoted counterbalancing means interconnecting said discharge chutes for lowering one of said discharge chutes into its extended position and for simultaneously raising the other into its retracted position; and
   (i) pivoted gate means connected to and pivotable with said counterbalancing means between two operative positions for directing ice from said screw conveyor into that one of said discharge hoppers whose discharge conduit is in its extended position.

2. In a refrigerator car icing machine, the combination of:
   (a) a supporting chassis movable along a predetermined path;
   (b) a rigid, one-piece, boom-type screw conveyor fixedly mounted on said chassis with respect to movement in the vertical direction, and pivotally mounted on said chassis for swinging movement about an upright axis, through an angle of substantially 180° in the horizontal direction, between two operative positions through an intermediate, inoperative position;
   (c) said screw conveyor being generally parallel to said path when in its inoperative position, and being generally perpendicular thereto when in either of its operative positions;
   (d) said screw conveyor being inclined upwardly at a fixed angle from its inner end to its outer end;
   (e) means for delivering ice to the inner end of said screw conveyor;
   (f) two depending discharge hoppers carried by said screw conveyor adjacent the outer end thereof and spaced apart in the direction of said screw conveyor;
   (g) two depending discharge chutes respectively communicating with said discharge hoppers and respectively movable vertically relative thereto between upper, retracted and lower, extended positions;
   (h) pivoted counterbalancing means interconnecting said discharge chutes for lowering one of said discharge chutes into its extended position and for simultaneously raising the other into its retracted position;
   (i) pivoted gate means connected to and pivotable with said counterbalancing means between two operative positions for directing ice from said screw conveyor into that one of said discharge hoppers whose discharge conduit is in its extended position; and
   (j) gravity operated means connected to said counterbalancing means for biasing said discharge chutes and said gate means to intermediate positions.

References Cited in the file of this patent

UNITED STATES PATENTS

| 997,742 | Bolz | July 11, 1911 |
| 1,065,754 | Wilkerson | June 24, 1913 |
| 2,298,119 | Gebert | Oct. 6, 1942 |
| 2,919,560 | Beemer et al. | Jan. 5, 1960 |
| 2,925,079 | Saxe | Feb. 16, 1960 |

FOREIGN PATENTS

| 83,662 | Germany | Nov. 4, 1895 |